S. J. EDWARDS.
Running-Gear.
No. 70,980
Patented Nov. 19, 1867.
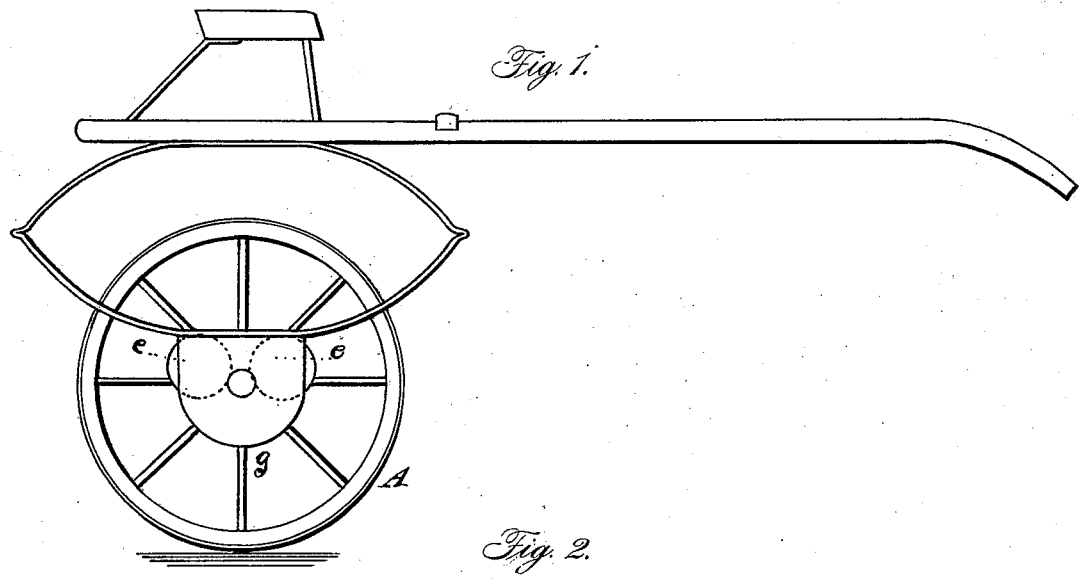
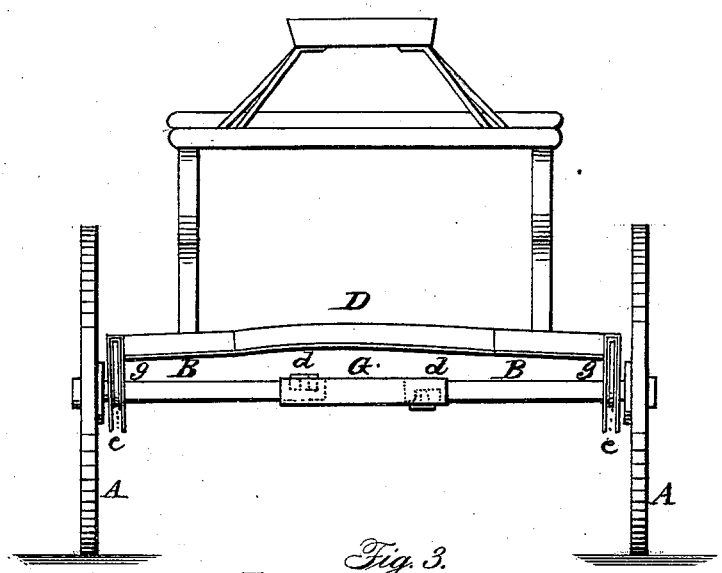
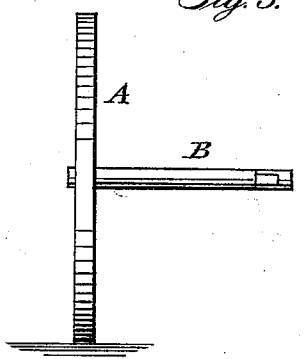
Witnesses:
Jno. Ellis
J. White
Inventor:
S. J. Edwards
Per
T. H. Alexander & Co.
Attys

United States Patent Office.

SOLOMON J. EDWARDS, OF NEW BERLIN, NEW YORK.

Letters Patent No. 70,980, dated November 19, 1867.

IMPROVEMENT IN RUNNING-GEAR FOR VEHICLES.

The Schedule referred to in these Letters Patent and making part of the same.

TO ALL WHOM IT MAY CONCERN:

Be it known that I, SOLOMON J. EDWARDS, of New Berlin, in the county of Chenango, and State of New York, have invented certain new and useful Improvements in Running-Gear for Wheel Vehicles; and I do hereby declare that the following is a full, clear, and exact description thereof, reference being had to the accompanying drawings, and to the letters of reference marked thereon, which form a part of this specification, in which—

Figure 1 is a side elevation.

Figure 2 a rear view, showing the manner of connecting the two arms which form the axle, and Figure 3 a view of one of the arms, exhibiting the slot, the object of which will be fully seen hereafter.

To enable others skilled in the art to make and use my invention, I will now describe its construction and operation.

B B' represent the two arms, each provided with a slot near its inner or contiguous end, as shown in fig. 3. A A are the wheels, secured to the arms in a permanent and fixed manner. C represents a connecting-sleeve, which fits over the inner ends of the arms B B'. This sleeve C is provided with thumb or set-screws for the purpose of securing the arms in their appropriate places. Thus, to adjust or take off the arms, it is only necessary to tighten or loosen the screws $d\ d$. $e\ e$ represent friction-rollers, confined in the metal boxes $g\ g$. These boxes are constructed simply by bending or forming a piece of metal, of suitable strength and dimensions, in such a way that the rollers may be confined between the sides, as fully indicated in figs. 1 and 2. D represents the perch, to which are secured the boxes $g\ g$.

It will thus be observed that from the extreme simplicity of my arrangement, it will rarely become necessary to remove the wheels, except in cases of accident, when, by simply unscrewing the thumb-screws $d\ d$, the arms may be easily removed.

Having thus fully described my invention, what I claim, and desire to secure by Letters Patent, is—

In combination with sleeve C and set-screws $d\ d$, I claim arms B B, boxes $g\ g$, and rollers $e\ e$, when all are constructed and arranged as and for the purpose set forth.

In testimony that I claim the foregoing as my own, I affix my signature in presence of two witnesses.

SOLOMON J. EDWARDS.

Witnesses:
 JOSEPH J. PHELPS,
 JAS. S. DYKES.